United States Patent [19]
Whitson et al.

[11] Patent Number: 5,470,089
[45] Date of Patent: Nov. 28, 1995

[54] SCOOTER

[76] Inventors: Damaras E. Whitson, 1150 Luxton St., Seaside, Calif. 93955; Birdie Bogdanovich, 3240 Wright St., Selma, Calif. 933662

[21] Appl. No.: 172,913

[22] Filed: Dec. 27, 1993

[51] Int. Cl.⁶ .................................................. B62M 1/00
[52] U.S. Cl. ...................... 280/87.041; 280/264; 280/293
[58] Field of Search ............................... 280/220, 87.01, 280/87.021, 87.041, 293, 264

[56] References Cited

U.S. PATENT DOCUMENTS

| | | | |
|---|---|---|---|
| 488,603 | 12/1892 | Devore et al. | 280/264 |
| 1,689,916 | 10/1928 | Fisher | 280/87.041 |
| 1,951,277 | 3/1934 | Elliotte | 280/87.041 |
| 2,200,935 | 5/1940 | Rodriguez | 280/87.041 |
| 2,489,910 | 5/1949 | Zsinor et al. | 280/87.041 |
| 3,992,029 | 11/1976 | Washizawa et al. | 280/87.041 |
| 4,761,014 | 8/1988 | Huang | 280/87.041 |

Primary Examiner—Mitchell J. Hill

[57] ABSTRACT

A scooter comprising a frame having a downwardly extending frame support member having an upper end and a lower end, a back fork including a stem having two spaced prongs extending therefrom, and a platform coupled between the lower end and the stem to support a user; a rigid yoke connected to the frame support member; a front fork including a stem with two prongs extending downwards therefrom, the stem disposed within the yoke; a steering column having a upper end and a lower end, the lower end coupled to the stem of the front fork within the yoke; handlebars coupled to the upper end of the steering column so that the front fork can be directionally pivoted by the operator in relation to the frame; a front wheel mounted between the prongs of the front fork for rotation; and a back wheel mounted between the prongs of the back fork for rotation.

1 Claim, 4 Drawing Sheets

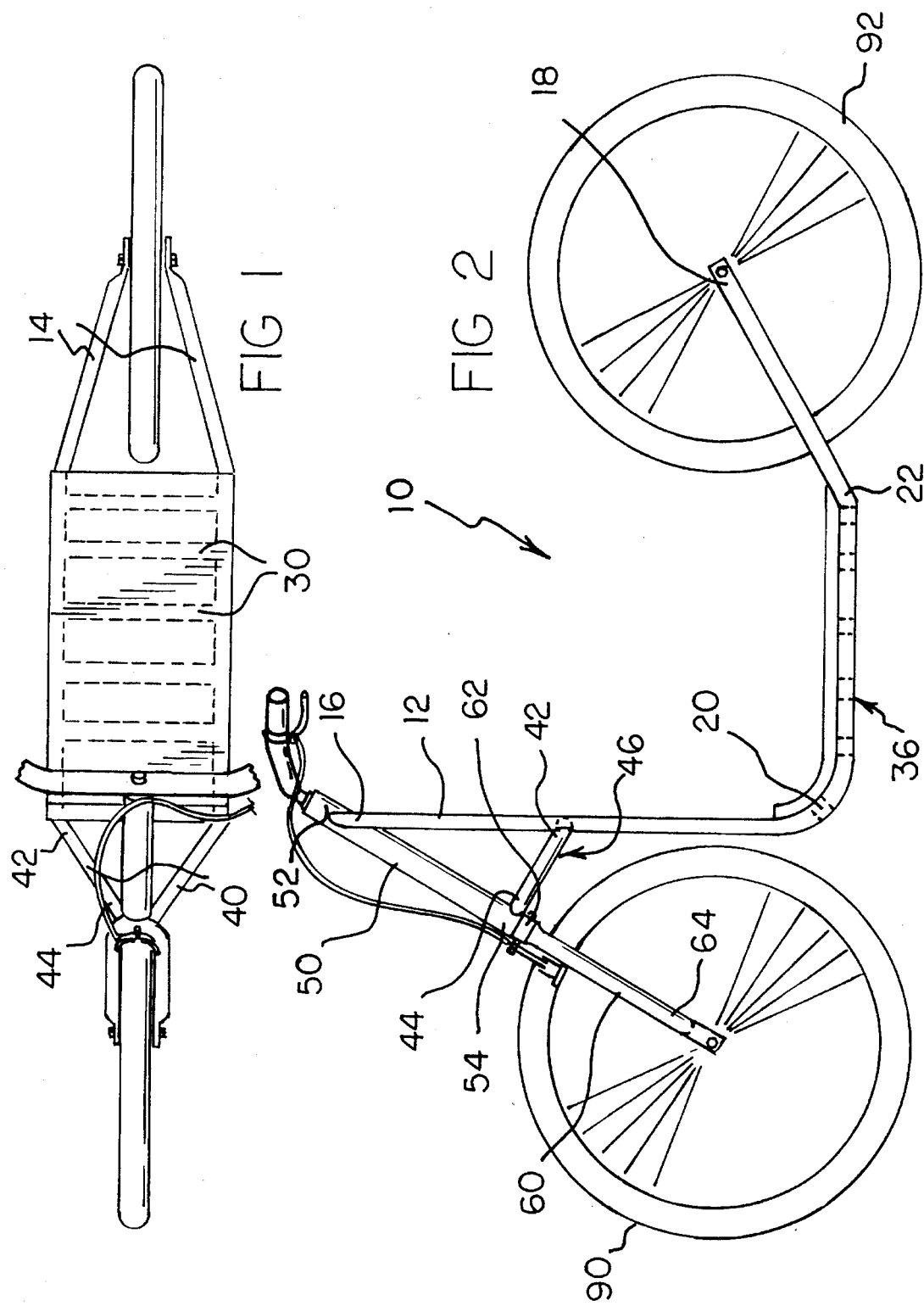

SCOOTER

BACKGROUND OF THE INVENTION

1. Field of the Invention

The present invention relates to a scooter and more particularly pertains to a scooter for an adult's recreation and exercise.

2. Description of the Prior Art

The use of scooters is known in the prior art. More specifically, scooters heretofore devised and utilized for the purpose of recreation and exercise are known to consist basically of familiar, expected and obvious structural configurations, notwithstanding the myriad of designs encompassed by the crowded prior art which have been developed for the fulfillment of countless objectives and requirements.

By way of example, U.S. Pat. Nos. 4,204,698 to Mihalik; U.S. Pat. No. 4,763,913 to Ehrlich; U.S. Pat. No. 4,790,550 to Simpson; U.S. Pat. No. 4,799,701 to Lindau; and U.S. Pat. No. 4,911,457 to Ishikawa disclose scooters used for recreation and exercise.

While these devices fulfill their respective, particular objective and requirements, the aforementioned patents do not describe a scooter specifically designed for adult recreation and exercise which has a contoured frame reinforced at the curved areas to support the weight of an adult and has standard bicycle tires, handlebars, and handbrakes.

In this respect, the scooter according to the present invention substantially departs from the conventional concepts and designs of the prior art, and in doing so provides an apparatus primarily developed for the purpose of an adult's recreation and exercise.

Therefore, it can be appreciated that there exists a continuing need for new and improved scooters which can be used for an adult's recreation and exercise. In this regard, the present invention substantially fulfills this need.

SUMMARY OF THE INVENTION

In the view of the foregoing disadvantages inherent in the known types of scooters now present in the prior art, the present invention provides an improved scooter for an adult's recreation and exercise. As such, the general purpose of the present invention, which will be described subsequently in greater detail, is to provide a new and improved scooter and method which has all the advantages of the prior art and none of the disadvantages.

To attain this, the present invention essentially comprises a scooter having a frame with two rigid and spaced rods, each rod having a front end, a rear end, a first intermediate location defined between the front end and the rear end, and a second intermediate location defined between the first intermediate location and the rear end, with the front ends of the rods, rear ends of the rods, first intermediate locations of the rods, and second intermediate locations of the rods being planarly offset and aligned, the rods extending downwardly and outwardly from the front ends to the first intermediate locations to define a front frame support member, the rods extending horizontally from the intermediate locations to the second intermediate locations, and the rods extending upwardly and inwardly from the second intermediate locations to the rear ends to define a back fork having two spaced prongs; a plurality of spaced links perpendicularly coupled to the rods between first and second intermediate locations to define a rear frame support member; a rigid plate coupled to the rear frame support member to define a platform where a user can stand; two rigid and spaced rods, each rod having a first end and a second end, with the first ends of the rods and second ends of the rods being planarly offset and aligned, the first ends of the rods coupled to the front frame support member and extending upwardly and inwardly to define a yoke support; and a rigid yoke having an upper end and a lower end, the upper end connected to the front frame support member, the lower end connected to the second ends of the yoke support. The scooter also has a front fork including a stem and two prongs extending downwardly therefrom, the stem disposed within the yoke; a steering column having a upper end and a lower end, the lower end coupled to the stem of the front fork within the yoke; handlebars coupled to the upper end of the steering column so that the front fork can be directionally pivoted by the operator in relation to the frame; a front wheel mounted between the prongs of the front fork for rotation, wherein the ratio of the vehicle length to wheel diameter is between about 2:1 to 3:1; a back wheel mounted between the prongs of the back fork for rotation, wherein the ratio of the vehicle length to wheel diameter is between about 2:1 to 3:1; and a handbrake coupled to the handlebars and the front fork for applying a braking force to the front wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved scooter which has all the advantages of the prior art scooters and none of the disadvantages.

It is another object of the present invention to provide a new and improved scooter which may be easily and efficiently manufactured and marketed.

It is a further object of the present invention to provide a new and improved scooter which is of durable and reliable construction.

An even further object of the present invention is to provide a new and improved scooter which is susceptible of a low cost of manufacture with regard to both materials and labor, and which accordingly is then susceptible of low prices of sale to the consuming public, thereby making such a scooter economically available to the buying public.

Still yet another object of the present invention is to provide a new and improved scooter which provides in the apparatuses and methods of the prior art some of the advantages thereof, while simultaneously overcoming some of the disadvantages normally associated therewith.

Even still another object of the present invention is to provide a new and improved scooter for an adult's recreation and exercise.

Even still another object of the present invention is to provide a new and improved scooter that uses standard bicycle tires, handlebars and handbrakes.

Even still another object of the present invention is to provide a new and improved scooter that has a contoured frame that is reinforced at the curved areas to support an adult and has a platform for standing which is set low to the ground, inherently creating a low center of gravity for the vehicle, making the scooter easy to control.

Even still another object of the present invention is to provide a new and improved scooter that can be used by anyone four feet tall or taller and weighs from about forty five to well over two hundred pounds.

Even still another object of the present invention is to provide a new and improved scooter that is safe and can be manipulated by those who cannot ride a bicycle, jog, or roller skate.

Lastly, it is an object of the present invention to provide a new and improved scooter comprising a frame having a downwardly extending frame support member having an upper end and a lower end, a back fork including a stem with two spaced prongs extending therefrom, and a platform coupled between the lower end and the stem to support a user; a rigid yoke connected to the frame support member; a front fork including a stem with two prongs extending downwardly therefrom, the stem disposed within the yoke; a steering column having a upper end and a lower end, the lower end coupled to the stem of the front fork within the yoke; handlebars coupled to the upper end of the steering column so that the front fork can be directionally pivoted by the operator in relation to the frame; a front wheel mounted between the prongs of the front fork for rotation; and a back wheel mounted between the prongs of the back fork for rotation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a upper view of the preferred embodiment of the scooter constructed in accordance with the principles of the present invention.

FIG. 2 is a side view of the preferred embodiment of the scooter of FIG. 1.

The same reference numerals refer to the same parts throughout the various Figures.

DESCRIPTION OF THE PREFERRED EMBODIMENT

Figure 3:
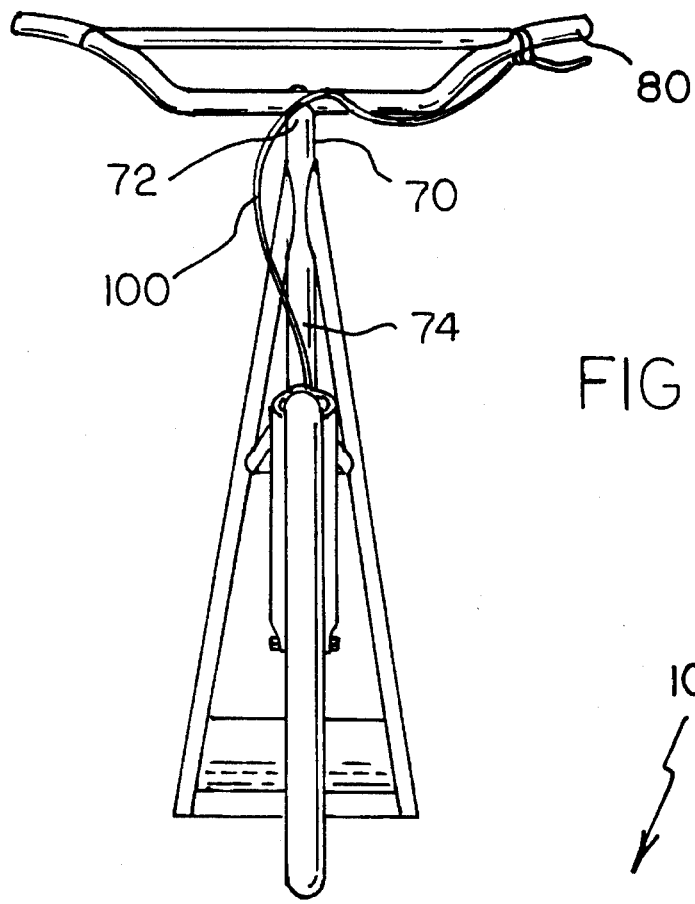
FIG. 3 is a front view of the preferred embodiment of the scooter of FIG. 1.
Figure 4:
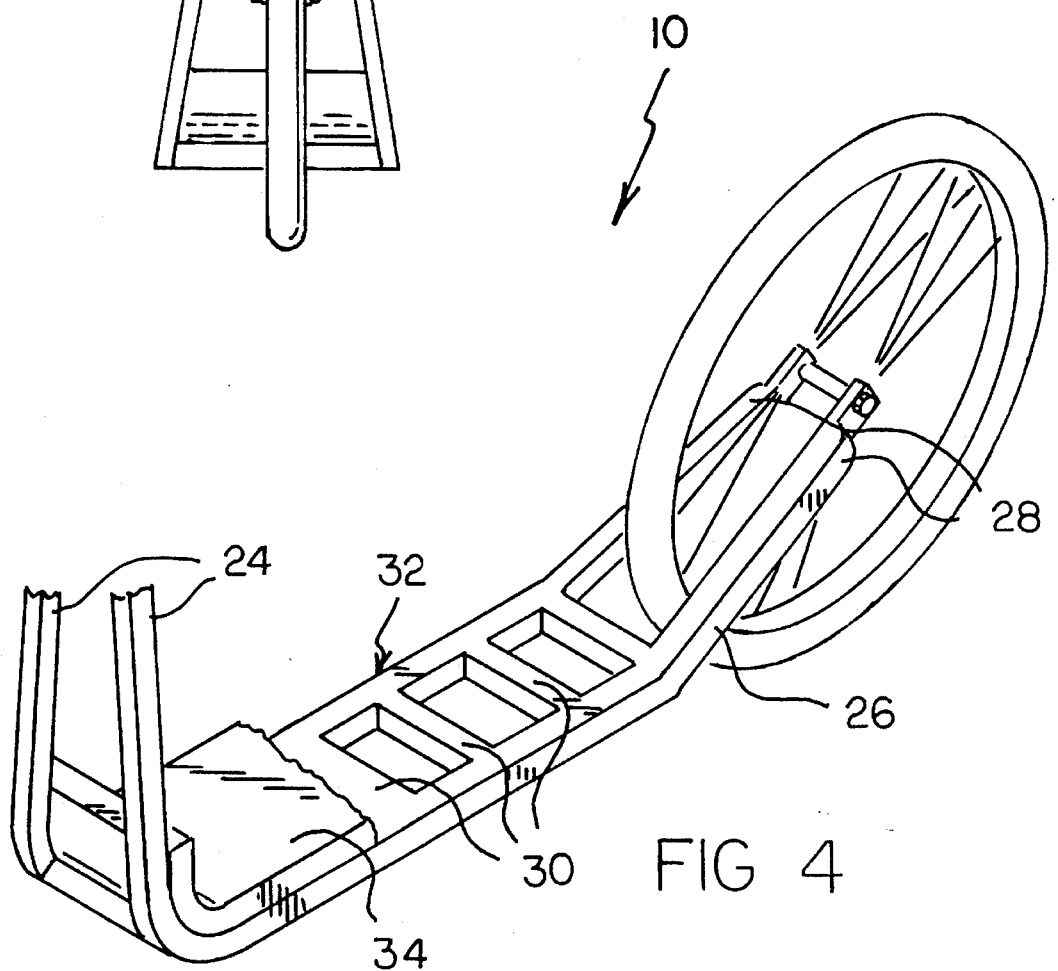
FIG. 4 is a perspective view of the platform, back fork and rear wheel of the scooter of FIG. 1.

With reference now to the drawings, and in particular, to FIG. 1 thereof, the preferred embodiment of the new and improved scooter embodying the principles and concepts of the present invention and generally designated by the reference number 10 will be described.

More specifically, it will be noted in the various Figures that the scooter 10 includes a contoured frame 12. The frame further includes two rigid and spaced rods 14. Each rod has a front end 16, a rear end 18, a first intermediate rod portion or location 20 defined between the front end and the rear end, and a second intermediate rod portion or location 22 defined between the first intermediate location and the rear end. The front ends of the rods, rear ends of the rods, first intermediate locations of the rods, and second intermediate locations of the rods are planarly offset and aligned with each other. The rods extend downwardly and outwardly in a triangular fashion from the front ends to the first intermediate locations to define a front frame support member 24. The rods then extend horizontally from the intermediate locations to the second intermediate locations. Finally, the rods then extend upwardly and inwardly from the second intermediate locations to the rear ends in a triangular fashion to define a back fork 26 having two spaced prongs 28.

In the preferred embodiment, the back fork extends upward from the second intermediate locations 60 degrees from the horizontal.

A plurality of spaced links 30 are perpendicularly coupled between the rods from the first to the second intermediate locations to define a rear frame support member 32. A rigid plate 34 is coupled to the rear frame support member to define a platform 36 where a user can stand. A portion of the plate near the front frame support member 24 is curved upwardly to help shield a user's feet and legs from road debris. The construction of the frame inherently creates a low center of gravity for the scooter, making it easier to maneuver and control. The frame is reinforced at the curved areas near the intermediate locations to support the weight of an adult.

The scooter includes another pair of rigid and spaced yoke support rods 40. Each rod yoke support has a first end 42 and a second end 44. The first ends of the rods and second ends of the yoke support rods are planarly offset and aligned with each other. The first ends of the yoke support rods are coupled to the front frame support member 24 and extend upwardly and inwardly in a triangular fashion to define a yoke support 46. In the preferred embodiment, the yoke support extends upwardly 30 degrees from the horizontal.

The scooter includes a rigid yoke 50 having an upper end 52 and a lower end 54. The upper end is connected to the front frame support member 24. The lower end is connected to the second ends of the yoke support 46.

The scooter includes a front fork 60. The front fork includes a stem 62 with two spaced prongs 64 extending downwardly therefrom. The front fork is oriented downward at an angle of 30 degrees from the vertical in the preferred embodiment. The stem is disposed within the yoke 50. Both the front fork 60 and back fork 26 are similar to the forks used on conventional bicycles.

The scooter includes a steering column 70 having a upper end 72 and a lower end 74. The lower end is coupled to the stem 62 of the front fork within the yoke 50. Handlebars 80 are coupled to the upper end 72 of the steering column so that the front fork 60 can be directionally pivoted by the operator in relation to the frame 12. The handlebars are similar to those used on conventional bicycles.

A front wheel 90 is mounted between the prongs 64 of the front fork 60 for rotation. The ratio of the vehicle length to wheel diameter is between about 2:1 to 3:1. A back wheel 92 is mounted between the prongs 28 of the back fork 26 for rotation. The ratio of the vehicle length to wheel diameter is between about 2:1 to 3:1. In the preferred embodiment, the wheels used are standard spoked 26-inch bicycle wheels, ensuring ease of replacement thereof since these standard wheels are readily available at most bicycle repair shops. Fenders can be coupled to the frame and placed over the wheels to shield a user from road debris.

A handbrake 100 is coupled to the handlebars 80 and the front fork 60 for applying a braking force to the front wheel 90. The handbrake is similar to those used on conventional bicycles. In the preferred embodiment, the handbrake is a standard bicycle handbrake, ensuring ease of replacement thereof since this handbrake is readily available at most bicycle repair shops. A second handbrake can also be used to apply a braking force to the back wheel.

The scooter is designed to accommodate anyone who is four feet tall or taller, and weighs from about forty five to well over two hundred pounds. The overall length of the scooter in the preferred embodiment is about seventy inches.

Figure 5:
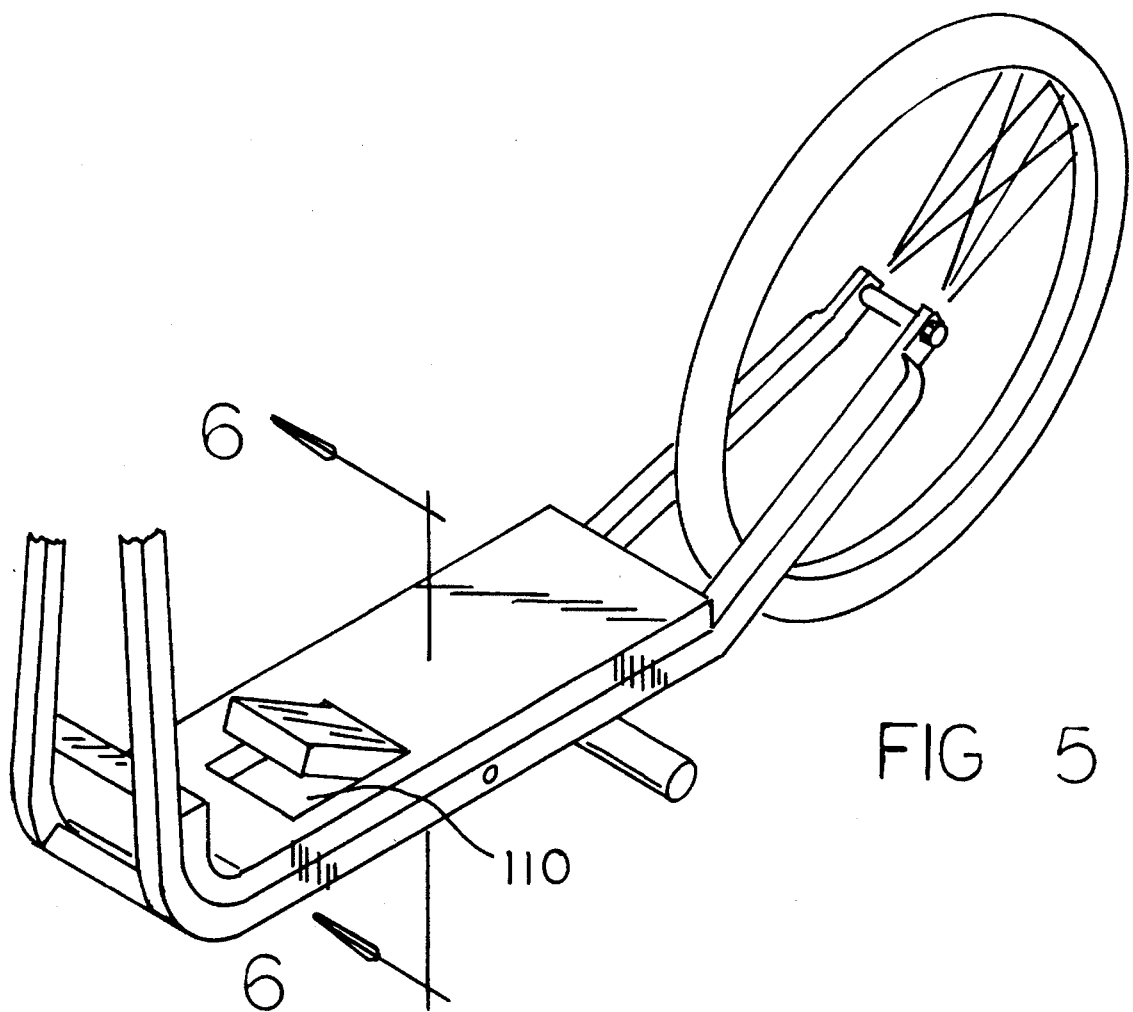
FIG. 5 is a perspective view of a scooter platform with a kickstand coupled thereto constructed in accordance with an alternate embodiment of the invention.
Figure 6:
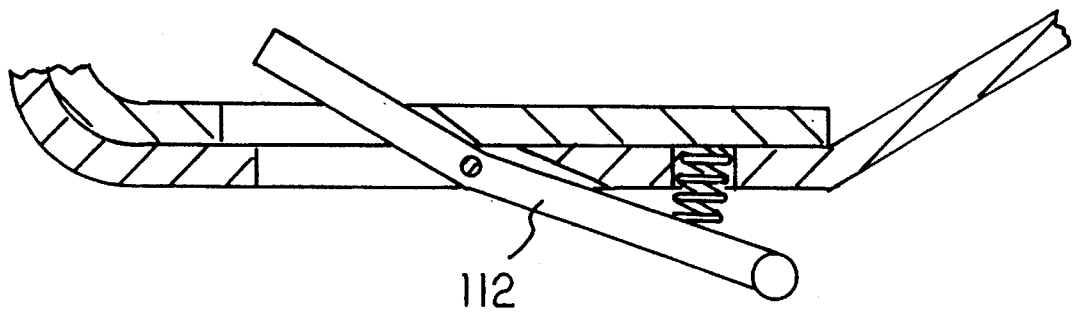
FIG. 6 is a side view of the kickstand as shown in FIG. 5.

A second embodiment of the present invention is shown in FIGS. 5 and 6. The platform 36 of the scooter has a hole 110 disposed thereon. A kickstand 112 is pivotally coupled to the platform with a portion thereof extending through the hole. A user can depress the kickstand from the platform to raise the kickstand and use the scooter.

Figure 7:
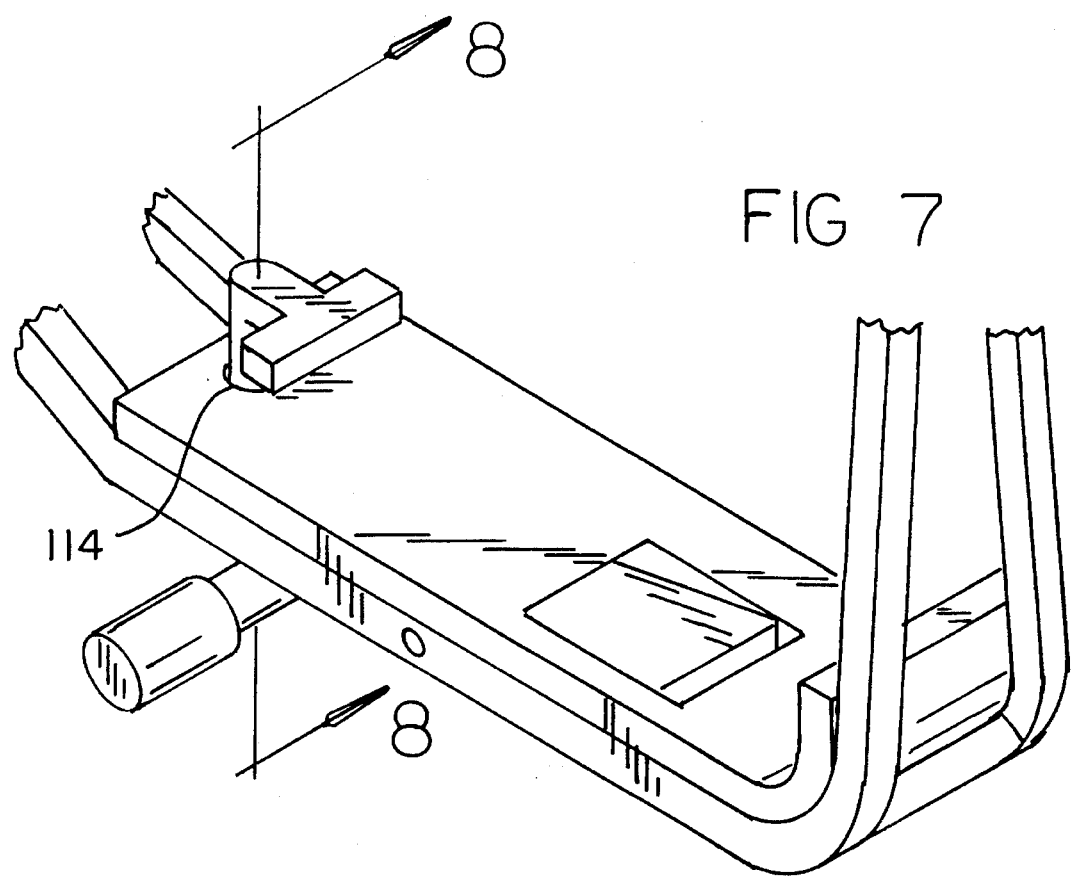
FIG. 7 is a perspective view of the scooter platform with a footbrake coupled thereto constructed in accordance with yet another alternate embodiment of the invention.
Figure 8:
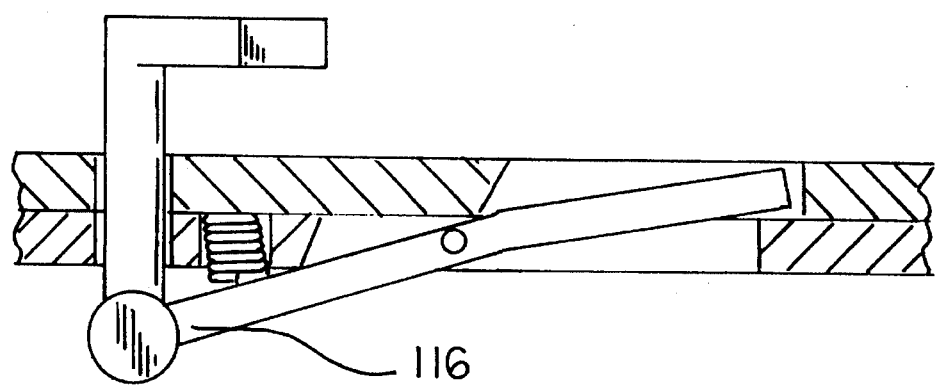
FIG. 8 is a side view of the footbrake as shown in FIG. 7.

A third embodiment of the present invention is shown in FIGS. 7 and 8. The platform 36 of the scooter has a hole 112 disposed thereon. A footbrake 116 is pivotally coupled to the platform with a portion thereof extending through the hole. A user can depress the footbrake from the platform to decrease the speed of the scooter.

In a fourth embodiment of the present invention, both the kickstand 112 and footbrake 116 can be coupled to the frame or platform for use with the scooter.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A frame for a vehicle with wheels, the vehicle having a height and a length, the frame having two rigid and spaced rods, each rod having a front end, a rear end, a first intermediate rod portion defined between the front end and the rear end, and a second intermediate rod portion defined between the first intermediate rod portion and the rear end, with the front ends of the rods, rear ends of the rods, first intermediate rod portions of the rods, and second intermediate rod portions of the rods being planarly offset and aligned, the rods extending downwardly from the front ends to the first intermediate rod portions forming a front frame support member, the rods extending horizontally from the intermediate rod portions to the second intermediate rod portions, and the rods extending upwardly from the second intermediate rod portions to the rear ends forming a back fork having two spaced prongs; a plurality of spaced links perpendicularly coupled between the rods from the first to the second intermediate rod portions to define a rear frame support member; a rigid plate coupled to the rear frame support member to define a platform; two rigid and spaced yoke support rods, each yoke support rod having a first end and a second end, with the first ends of the yoke support rods and the second ends of the yoke support rods being planarly offset and aligned, each yoke support rod having a first end and a second end with the first ends of the yoke support rods coupled to the front frame support member and extending upwardly and inwardly to define a yoke support; and a rigid yoke having an upper end and a lower end, the upper end connected to the front frame support member, the lower end connected to the second ends of the yoke support;

- a front fork including a stem and two prongs extending downwardly therefrom, the stem disposed within the yoke;
- a steering column having a upper end and a lower end, the lower end coupled to the stem of the front fork within the yoke;
- handlebars coupled to the upper end of the steering column so that the front fork can be directionally pivoted in relation to the frame;
- a front wheel mounted between the prongs of the front fork for rotation, wherein the ratio of the vehicle length to the wheel diameter is between about 2 to 1 and 3 to 1;
- a back wheel mounted between the prongs of the back fork for rotation, wherein the ratio of the vehicle length to wheel diameter is between about 2 to 1 and 3 to 1;
- the diameter of the wheels constituting the majority of the height of the frame and vehicle; and
- a handbrake coupled to the handlebars and the front fork for applying a braking force to the front wheel.

* * * * *